United States Patent [19]

Metzinger et al.

[11] 4,334,033

[45] Jun. 8, 1982

[54] PROCESS FOR THE MANUFACTURE OF POLYURETHANE ELASTOMERS

[75] Inventors: Lothar Metzinger; Otmar Zipp, both of Osnabrueck; Heinz Bollmann, Alfhausen-Heeke, all of Fed. Rep. of Germany

[73] Assignee: BASF Aktiengesellschaft, Ludwigshafen, Fed. Rep. of Germany

[21] Appl. No.: 194,530

[22] Filed: Oct. 6, 1980

[30] Foreign Application Priority Data

Oct. 9, 1979 [DE] Fed. Rep. of Germany ....... 2940856

[51] Int. Cl.³ .............................................. C08G 18/14
[52] U.S. Cl. ...................................... 521/159; 528/65; 528/66
[58] Field of Search ..................... 521/159; 528/65, 66

[56] References Cited

U.S. PATENT DOCUMENTS 3,905,925  9/1975  Veroloet ............................. 521/159

*Primary Examiner*—Maurice J. Welsh
*Attorney, Agent, or Firm*—Bernhard R. Swick

[57] ABSTRACT

A process for the manufacture of non-cellular and cellular polyurethane elastomers by
 (a) preparing a hydroxyl group-containing prepolymer by reacting a higher molecular weight polyhydroxyl compound and optionally a chain extender with an organic diisocyanate at a weight ratio of OH groups to NCO groups of 1.2:1 to 2:1,
 (b) dividing the prepolymer into two components A and B in a weight ratio of about 80:20 to 20:80,
 (c) reacting component A with 1,5-naphthylene diisocyanate (NDI) in a weight ratio of OH:NCO groups of about 1:2.5 to 1:12 to produce a terminal NCO group-containing NDI-polyurethane adduct,
 (d) mixing component B with chain extenders and/or cross-linking agents and/or water, and optionally auxiliaries and additives, and
 (e) reacting the NDI-polyurethane adduct (from step c) with the mixture from step d.

17 Claims, No Drawings

PROCESS FOR THE MANUFACTURE OF POLYURETHANE ELASTOMERS

BACKGROUND OF THE INVENTION

1. Field of the Invention

This invention relates to a process for the manufacture of polyurethane non-cellular, molded elastomers or cellular elastomers wherein a hydroxyl group-containing prepolymer is divided into two components, A and B, in a weight ratio of about 80:20 to 20:80. An NCO group containing NDI polyurethane adduct is prepared by reacting component A with 1,5-naphthylene diisocyanate (NDI). This adduct is subsequently reacted with a mixture of component B with materials selected from the group consisting of chain extenders, cross-linking agents, water and mixtures thereof. Conventional auxiliaries and additives may also be incorporated with component B.

2. Prior Art

Polyurethane elastomers which can be processed by thermoplastic means, based primarily on linear polyester polyols of aliphatic dicarboxylic acids and alkylene glycols, hydroxy carboxylic acids or polyether polyols based on polytetrahydrofuran are part of the current state of the art. In survey form, these polyurethane elastomers are described, for instance, in "Urethanes in Elastomers and Coatings", Technomic Publishing Company, 256 West State Street, Westport, Connecticut, U.S.A., 1973, pages 201 to 230, or in the *Plastics Handbook*, Vol. VII, Polyurethanes by R. Vieweg and H. Hoechtlen, Carl Hanser Publishers, Munich, 1966, starting on page 206.

An overview of known heat-curable, non-thermoplastic polyurethane molding resins is given in *Polyurethanes Chemistry and Technology by J. H. Saunders and K. C. Frisch*, Part II, beginning on page 758 (Interscience Publishers, 1964).

In many applications, it is desirable to use 1,5-naphthylene diisocyanate (NDI) in addition to other organic diisocyanates for the manufacture of polyurethane elastomers. This is particularly desirable for products having good thermal resistance. A drawback in processing NDI is that it has a solidification point of 127° C. and cannot be reacted by the one-shot process as employed, for example, with hexamethylene diisocyanate, toluene diisocyanate, or 4,4'-diphenylmethane diisocyanate. Non-cellular molding elastomers and cellular elastomers based on NDI can therefore be produced only according to the prepolymer process.

In the manufacture of non-cellular as well as cellular polyurethane elastomers from NDI according to the prepolymer process, the NCO group-containing prepolymer and the "cross-linking agent" and/or water as blowing agent must be reacted in extremely unfavorable quantity ratios. Thus, for instance, 100 parts of NCO group-containing prepolymers and approximately 0.5 to 3 parts of "cross-linking agents" must be mixed quickly and intensively for the manufacture of cellular elastomers. This not only requires special mixers, but also extremely accurately operating metering pumps. When exposed to continuous loads, such mixtures and metering pumps are predominantly susceptible to technical failure and demand high maintenance expenditure.

The purpose of this invention is to produce cellular polyurethane elastomers or non-cellular molding elastomers based on NDI using commonly-applicable processing and metering devices. The basically known raw materials are to be used in this case also.

BRIEF DESCRIPTION OF THE INVENTION

Surprisingly, the problem was solved by a process for the manufacture of both cellular and non-cellular polyurethane elastomers by
  (a) preparing a hydroxyl group containing prepolymer by reacting a higher molecular weight polyhydroxyl compound and optionally a chain extender with an organic diisocyanate at a weight ratio of OH groups to NCO groups of 1.2:1 to 2:1,
  (b) dividing the prepolymer into two components A and B in a weight ratio of about 80:20 to 20:80,
  (c) reacting component A with 1,5-naphthylene diisocyanate (NDI) in a weight ratio of OH:NCO groups of about 1:2.5 to 1:12 to produce a terminal NCO group containing NDI-polyurethane adduct,
  (d) mixing component B with chain extenders and/or cross-linking agents and/or water, and optionally auxiliaries and additives, and
  (e) reacting the NDI-polyurethane adduct (from step c) with the mixture from step d.

The process according to this invention has the advantage that the raw materials, particularly the NDI-polyurethane adduct (from step c), and the mixture from step d can be mixed intensively in equal parts by weight and brought to reaction very quickly. The resultant polyurethane elastomers are homogeneous and have uniform mechanical properties throughout the entire molded product.

DESCRIPTION OF THE PREFERRED EMBODIMENTS

Polyether polyols, and particularly polyester polyols, are will suited as higher molecular weight polyhydroxyl compounds. However, other hydroxyl group-containing polymers may also be taken into consideration. These include polyacetals such as those of polyoxymethylene and primarily water-insoluble formals such as polybutanediol formal, polyhexanediol formal, and polycarbonates particularly those of diphenylcarbonate and 1,6-hexanediol produced by transesterification. The polyhydroxyl compounds must be at least predominantly linear, that is, they must have a difunctional structure in the sense of the isocyanate reaction. The above-mentioned polyhydroxyl compounds may be used as individual components or as mixtures.

Suitable polyether polyols may be produced by reacting one or more alkylene oxides with 2 to 4 carbon atoms in the alkylene radical with an initiator molecule which contains several active hydrogen atoms in bonded form. Suitable alkylene oxides include ethylene oxide, 1,2-propylene oxide, epichlorohydrin and 1,2- and 2,3-butylene oxide. Preferably used are ethylene oxide and mixtures of propylene oxide and ethylene oxide. The alkylene oxides may be used individually, alternating in sequence, or as mixtures. Possible initiator molecules include: water, aminoalcohols such as N-alkyl-diethanolamine, for instance, N-methyl-diethanolamine and diols, such as ethylene glycols, propylene glycols, 1,4-butanediols and 1,6-hexanediols. If so required, mixtures of initiator molecules may also be used. Other suitable polyether polyols are the hydroxyl group-containing polymerization products of tetrahydrofuran. Rather unfavorable results, on the other hand, were obtained with pure polypropylene glycol ethers since these are commonly not sufficiently reactive as components in step e.

Preferably used are hydroxyl group-containing polytetrahydrofuran and polyether polyols of propylene oxide and ethylene oxide containing more than 50 percent, preferably 60 to 80 percent, of the OH groups as primary hydroxyl groups, and where at least part of the ethylene oxide is present as a terminal block.

Such polyether polyols may be obtained, for instance, by initially polymerizing the propylene oxide and subsequently the ethylene oxide or by initially copolymerizing the entire propylene oxide mixed with part of the ethylene oxide and then polymerizing the remaining ethylene oxide to this product or by step-wise polymerization of part of the ethylene oxide and then the entire propylene oxide and the rest of the ethylene oxide to the initiator molecule.

The primarily linear polyether polyols have molecular weights of 500 to 8000, preferably 600 to 6000, and particularly 800 to 3000. They may be used individually as well as in the form of mixtures.

Suitable polyester polyols may be produced, for instance, from dicarboxylic acids having 2 to 12 carbon atoms and multifunctional alcohols. Possible dicarboxylic acids include: aliphatic dicarboxylic acids such as succinic acid, glutaric acid, adipic acid, sebaric acid, azelaic acid, and sebacic acid, and aromatic dicarboxylic acids such as phthalic acid, isophthalic acid and terephthalic acid. The dicarboxylic acids may be used individually or as mixtures. For the manufacture of the polyester polyols, it may, under certain circumstances, be advantageous to replace the carboxylic acids with the corresponding carboxylic acid derivates, such as carboxylates having 1 to 4 carbon atoms in the alcohol radical, carboxylic anhydrides or carboxylic acid chlorides. Examples for multifunctional alcohols are glycols having 2 to 16 carbon atoms, preferably 2 to 6 carbon atoms such as ethylene glycol, diethylene glycol, 1,4-butanediol, 1,5-pentanediol, 1,6-hexanediol, 1,10-decanediol, 2,2-dimethylpropanediol-1,3, trimethylene glycol, and dipropylene glycol. Depending upon the desired properties, the multifunctionals may be used alone or possibly as mixtures. Also suited are esters of carbonic acid with the referenced diols, particularly those having 4 to 6 carbon atoms, such as 1,4-butanediol and/or 1,6-hexanediol, condensation products of ω-hydroxycarboxylic acids such as ω-hydroxycapronic acid and preferably polymerization products of lactones such as possibly substituted ε-caprolactones.

Preferably used as polyester polyols are ethanediol polyadipates, 1,4-butanediol polyadipates, ethanediol-butanediol adipates, 1,6-hexanediol neopentylglycol polyadipates, 1,6-hexanediol-1,4-butanediol polyadipates, and polycaprolactones.

The polyester polyols have molecular weights of 500 to 6000, preferably of 800 to 3000.

For the manufacture of hydroxyl group-containing prepolymers (step a), optionally low molecular weight chain extenders may be used mixed with the higher molecular weight, primarily linear polyhydroxyl compounds. Examples for low molecular chain extenders include short-chained diols, preferably those having molecular weights of less than 500, particularly those having molecular weights of 30 to 300. Possible examples include diols such as ethanediol, 1,4-butanediol, 1,6-hexanediol, diethylene glycol, dipropylene glycol, and hydroquinone-di-β-hydroxyethylether. Preferably, however, the hydroxyl group-containing prepolymers are produced without adding chain extenders.

Suitable examples for the manufacture of hydroxyl group-containing prepolymers (step a) include aliphatic, cycloaliphatic and preferably aromatic diisocyanates. In detail, these include: aliphatic diisocyanates such as hexamethylene diisocyanate, cycloaliphatic diisocyanates such as isophorone diisocyanate, 1,4-cyclohexane diisocyanate, 1-methyl-2,4- and 2,6-cyclohexane diisocyanate, and 4,4'-dicyclohexylmethane diisocyanate and preferably, aromatic diisocyanates such as 2,4-toluene diisocyanate, mixtures of 2,4- and 2,6-toluene diisocyanate, 4,4'-diphenylmethane diisocyanate, mixtures of 2,4'- and 4,4'-diphenylmethane diisocyanate, urethane-modified liquid 4,4'-diphenylmethane diisocyanates, and 1,5-naphthylene diisocyanates. Preferably used are hexamethylene diisocyanate, isophorone diisocyanate, 2,4-toluene diisocyanate, mixtures of 2,4- and 2,6-toluene diisocyanate, 4,4'-diphenylmethane diisocyanate and mixtures of 2,4'- and 4,4'-diphenylmethane diisocyanate.

As already mentioned, chain extenders, cross-linking agents, as well as auxiliaries and additives, may also be used for the manufacture of the non-cellular molding elastomers or cellular polyurethane elastomers. Possible examples include catalysts, surface-active substances, flame protection agents, hydrolysis protection agents, stabilizers, protecting from light, heat or discoloration, dyes, pigments, inorganic and organic fillers.

Possible chain extenders are particularly the above-referenced short-chained diols. Examples of cross-linking agents which have proven to work well include diamines such as isophorone diamine, 2,4- and 2,6-toluene diamine, and primary ortho-di-, tri- or tetraalkyl-substituted 4,4'-diaminodiphenylmethanes.

Suitable catalysts which promote the reaction between the NCO groups of the isocyanates and the Zerewitinoff-active hydrogens of the OH and NH$_2$ groups of the higher molecular weight polyhydroxyl compounds and possibly of chain extenders, cross-linking agents and water, and which are suited to accelerate the formation of the hydroxyl group-containing prepolymers (step a), the NDI-polyurethane adducts (step c) and the reaction (step e) between the NDI-polyurethane adducts (step c) and the mixture from step d, are the tertiary amines known according to the state of the art as commonly used. These include triethylamine, dimethylcyclohexylamine, N-methylmorpholine, N,N'-dimethylpiperazine, diazabicyclo-(2,2,2)-octane and similar, as well as particularly organic metal compounds, such as the ester of titanic acid, iron compounds such as iron acetylacetonate, tin diacetate, tin dioctoate, tin dilaurate, or the tin dialkyl salts of aliphatic carboxylic acids such as dibutyltin diacetate, dibutyltin dilaurate, or similar substances. The catalysts are normally used in quantities of 0.001 to 0.1 part per 100 parts of higher molecular polyhydroxyl compound, possibly, however, the catalysts may also be totally eliminated if so required.

Other substances to be taken into consideration include surface-active substances which support the homogenization of the raw materials and which are possibly also suited to regulate the cell structure of the cellular polyurethane elastomers. Examples include siloxane-oxyalkylene-mixed polymerizates and other organopolysiloxanes, ethoxylated alkylphenols, ethoxylated fatty alcohols, ester of polyoxyethylene, paraffin oils, castor oil, and/or the ester of ricinoleic acid and Turkey red oil, which are used in quantities of 0.2 to 6 parts by weight per 100 parts by weight of polyhydroxyl compound.

Suitable flame retardants include tricresyl phosphate, tris-2-chloroethyl phosphate, tris-chloropropyl phosphate, and tris-2,3-dibromopropyl phosphate.

In addition to the already mentioned halogen-substituted phosphates, inorganic flame retardants such as red phosphorus, antimony trioxide, arsenic oxide, ammonium phosphate, calcium sulfate, and melamine may also be used to render the polyurethane elastomers flame resistant. It has generally proven to be advantageous to use 5 to 50 parts by weight, preferably 5 to 25 parts by weight, of the referenced flame retardants per 100 parts by weight of polyhydroxyl compound.

More detailed data concerning the above-referenced other auxiliaries and additives are contained in the literature, for instance, in *Polyurethanes, Chemistry and Technology*, by J. H. Saunders and K. C. Frisch, Parts 1 and 2, Interscience Publishers, 1962 and/or 1964.

The non-cellular molded elastomers and the cellular polyurethane elastomers are advantageously produced according to this invention as follows:

Initially, the high molecular polyhydroxyl compounds and possibly chain extenders are reacted with the organic diisocyanates at temperatures of 60° to 150° C., preferably of 80° to 130° C. and reaction times of 0.1 to 24 hours, preferably of 0.5 to 4 hours, in such quantities that the ratio of the OH groups to the NCO groups is 1.2:1 to 2:1, preferably 1.4:1 to 2:1. The resultant hydroxyl group-containing prepolymers (a), having average molecular weights of approximately 1100 to approximately 20,000, preferably of 1600 to 8000, can be cured at 60° to 140° C. for 15 minutes to 24 hours, if so required, and can subsequently be stored on an interim basis.

In accordance with the invention, the resultant hydroxyl group-containing prepolymers are divided into a component A and a component B in a weight ratio of approximately 80:20 to 20:80, preferably 80:20 to 40:60, and particularly 80:20 to 60:40. After reaction with NDI, storage-stable NDI-polyurethane adducts are obtained especially in those cases where component A represents 60 to 80 percent by weight of the total quantity of hydroxyl group-containing prepolymer (from step a) so that this process variation is being preferred when the NDI-polyurethane adduct is stored on an interim basis for a prolonged period of time.

At temperatures from 100° to 150° C., preferably of 120° to 140° C., and reaction times of 0.25 to 3 hours, preferably 0.25 to 1 hour, component A is subsequently reacted with 1,5-naphthylene diisocyanate (NDI) in a ratio of OH to NCO groups of 1:2.5 to 1:12, preferably 1:4 to 1:9, to form an NDI-polyurethane adduct with terminal NCO groups and having an NCO content of 1.9 to 19.7 percent by weight, preferably of 3.6 to 16.5 percent by weight.

The resultant NDI-polyurethane adducts can be reacted directly with the mixture from step d to form non-cellular molding elastomers. In addition to component B, the mixture from step d contains one or more of the above-referenced chain extenders, preferably diols, particularly 1,4-butanediol, and ethylene glycol and optionally cross-linking agents, auxiliaries and additives.

To produce cellular polyurethane elastomers, water is added to mixture B as chain extender or blowing agent in a quantity of 0.07 to 4.1, preferably of 0.3 to 2.9, percent by weight relative to the weight of the higher molecular weight polyhydroxyl compound.

For further reaction, the NCO-polyurethane adducts (from step c) and mixture from step d are heated to temperatures of approximately 80° to 115° C., preferably of 90° to 110° C., for the NCO-polyurethane adducts (c) and to temperatures of 50° to 90° C. for the mixture from step d.

At these temperatures, the substances are intensively mixed in quantity ratios of NCO groups of the NDI-polyurethane adducts (from step c) to Zerewitinoff-active hydrogen atoms of the OH and possibly NH2 groups of the mixture (from step d) of 0.9 to 1.3:1, preferably of 0.98 to 1.1:1, and are poured into molds or onto sheets and are allowed to harden. In order to achieve optimum mechanical properties, it may be advantageous to cure the resultant non-cellular molded elastomers upon unmolding or in the mold at temperatures of 60° to 140° C., preferably 80° to 120° C., for 48 to 0.1 hours, preferably for 24 to 3 hours.

The non-cellular molded elastomers produced in accordance with the process of this invention, having densities of 950 to approximately 2500 grams per liter, and the cellular polyurethane elastomers having densities of 200 to 800 grams per liter, preferably 300 to 700 grams per liter, are uniform and have very good mechanical properties.

The cellular products are suited for shock absorption (vibration absorption) as spring elements for the elastic and vibration-absorbing bearing installation in machine and automobile construction, and as grinding agent for grinding discs. The non-cellular molded elastomers are suited for the manufacture of wipers, as blade strips (edges) for snow plows, as coupling units in automobile construction having an absorptive effect and as springs with high load absorption.

Unless otherwise indicated, all parts and ratios referred to in the examples and claims are by weight and all temperatures are in degrees centigrade.

EXAMPLE 1

8000 parts of a polyethylene glycol adipate, having a OH number of 56, are dehydrated at 120° C. and 50 millibars for 2 hours in a mixing flask equipped with thermometer and vacuum connection, and subsequently reacted with 348 parts of 2,4-:2,6-toluene diisocyanate (weight ratio 80:20) at 120° C. for 4 hours. 8348 parts of a hydroxyl group-containing prepolymer are obtained having an average molecular weight of 4174.

417 parts of the resultant hydroxyl group-containing prepolymer are reacted at 130° C. for a period of 30 minutes with 147 parts of 1,5-naphthylene diisocyanate to produce an NDI-polyurethane adduct having terminal NCO groups.

For the manufacture of a non-cellular molded elastomer, 100 parts of the NDI-polyurethane adduct (NCO content 8.6 percent) at a temperature of 110° C., are mixed intensively with 68.5 parts of the above-referenced hydroxyl group-containing prepolymer and 7.4 parts of 1,4-butanediol having a temperature of 90° C. After homogenizing, the melted polyurethane mixture is poured into molds and is cured at 110° C. for 16 hours.

This results in a non-cellular molded elastomer having the following mechanical properties:
Shore A Hardness (DIN 53 505): 96
Tear Strength (DIN 53 504): 45 N/mm$^2$
Breaking Elongation (DIN 53 504): 650 percent Wear (DIN 53 516): 50 mm³
Compression Strain (DIN 53 517); 26 percent

EXAMPLE 2

8000 parts of a previously dehydrated hydroxyl group-containing polytetrahydrofuran having an OH number of 56 and 54 parts of 1,4-butanediol are reacted with 575 parts of 4,4'-diphenylmethane diisocyanate at 110° C. for 60 minutes in a mixing flask equipped with thermometer and vacuum connection in the presence of 0.2 parts of tin dioctoate as catalyst. This produces 8629 parts of a hydroxyl group-containing prepolymer which is divided into a component A and a component B.

431.5 parts of component A are reacted with 169.1 parts of 1,5-napthylene diisocyanate at 140° C. for a period of 20 minutes to produce an NCO group-containing NDI-polyurethane adduct having an NCO content of 9.2 percent by weight and the product is briefly degassed.

431.5 parts of component B are mixed with 48.4 parts of 1,4-butanediol. The resultant mixture is heated to 90° C. and reacted with the NDI-polyurethane adduct which has been heated to 110° C. After homogenizing (3 minutes), the reaction mixture is placed in a mold at 90° C. and allowed to harden. After 15 to 30 minutes, the product is unmolded and the molded part is cured at 110° C. for 16 hours.

EXAMPLE 3

60 parts of a polycaprolactone diol having an OH number of 37.4 are reacted with 16.8 parts of hexamethylene diisocyanate at 130° C. for 30 minutes and the product is subsequently cured at 90° C. for 16 hours and divided into a component A and component B.

308.4 parts of component A are reacted with 76.5 parts of 1,5-naphthylene diisocyanate at 130° C. for 60 minutes to produce an NDI-polyurethane adduct.

308.4 parts of component B are mixed with 22.1 parts of 1,4-butanediol and 6 parts of a carbodiimide (commercial product ®Stabaxol I of Bayer AG). The resultant mixture is heated to 90° C., is intensively mixed with the NDI-polyurethane adduct, which has been heated to 110° C. for a period of 4 minutes, and poured into a mold preheated to 90° C. After 15 minutes, the part is unmolded and the molded elastomer is tempered at 110° C. for 24 hours.

The following mechanical properties are measured on the molded elastomers:

Shore A Hardness (DIN 53 505): 95
Tear Strength (DIN 53 504): 45 N/mm²
Breaking Elongation (DIN 53 504): 600 percent
Wear (DIN 53 516): 50 mm³
Compression Strain (DIN 53 517): 45 percent

EXAMPLE 4

800 parts of a polyethylene glycol adipate with an OH number of 56, and 348 parts of a mixture of 2,4- and 2,6-toluene diisocyanate (weight ratio 80:20) are heated to 120° C. for 4 hours.

417 parts of the resultant hydroxyl group-containing prepolymers are reacted with 147 parts of 1,5-naphthylene diisocyanate and 0.5 parts of an organo-functional silicone oil (®Baysilon OL, commercial product by Bayer AG) at 130° C. for 30 minutes to produce an NDI-polyurethane adduct containing NCO groups.

417 parts of the resultant hydroxyl group-containing prepolymer, 8.6 parts of water, and 6 parts of an ester of polyoxyethylene (®Bevaloid 815 M by Bevaloid Ltd.), are intensively mixed for 10 seconds, heated to 65° C., and mixed with the above-described NDI-polyurethane adduct which has been heated to 110° C. The mixture is poured into a hot closeable metal mold where it is allowed to foam and is dejigged after 30 minutes. The resultant cellular elastomeric molded part is cured at 100° C. for 24 hours. The product has the following mechanical properties:

Density: 500 g/l
Tear Strength (DIN 53 571): 5.5 N/mm²
Breaking Elongation (DIN 53 571): 450 percent
Graves Tear Strength (DIN 53 575): 16 N/mm
Compression Strain, 40% Compression: 0.7 N/mm²

EXAMPLES 5 to 19 and COMPARISON EXAMPLE

If one proceeds according to the data of Example 1, but uses the raw materials listed in Tables 1 to 4 in the described quantity, and separates the resultant hydroxyl group-containing prepolymer into components A and B in a weight ratio of 50:50, molded elastomers and cellular elastomers, having the described mechanical properties, are obtained.

The amount of naphthylene-1,5-diisocyanate and/or 4,4'-diphenylmethane diisocyanate used for the manufacture of the NDI-polyurethane adduct and/or the 4,4'-diphenylmethane diisocyanate polyurethane adduct (comparison example) is, in each case, relative to the above-referenced total amount of hydroxyl group-containing prepolymer and possibly water.

TABLE 1

Manufacture of Molded Elastomers

| Examples | 1 | 5 | 6 | Comparison Example |
|---|---|---|---|---|
| Raw Materials: | | | | |
| Hydroxyl group-containing prepolymer: | | | | |
| Polyethylene glycol adipate (mole weight 2000) (moles) | 2 | 2 | 2 | 2 |
| 2,4-:2,6-Toluene diisocyanate (80:20) (moles) | 1 | — | — | 1 |
| 4,4'-Diphenylmethane diisocyanate (moles) | — | 1 | — | — |
| 1,6-Hexamethylene diisocyanate (mole) | — | — | 1 | — |
| Viscosity 90° mPas | 1800 | 2800 | 1600 | 1800 |
| Viscosity 130° mPas | 700 | 900 | 500 | 700 |
| NCO group-containing polyurethane adduct: | | | | |
| 4,4'-Diphenylmethane diisocyanate (moles) | — | — | — | 7 |
| 1,5-naphthylene diisocyanate (moles) | 7 | 7 | 7 | — |
| Mechanical properties: | | | | |
| Shore A Hardness (DIN 53 503) | 96 | 96 | 89 | 62 |
| Tear Strength (DIN 53 504) N/mm² | 45 | 40 | 42 | 20 |
| Breaking Elongation (DIN 53 504) % | 650 | 500 | 630 | 750 |
| Wear (DIN 53 516) mm³ | 50 | 55 | 60 | Sample Melts |

TABLE 1-continued

Manufacture of Molded Elastomers

| Examples | 1 | 5 | 6 | Comparison Example |
|---|---|---|---|---|
| Compression Strain 70° (DIN 53 517) % | 26 | 30 | 25 | 95 |

TABLE 2

Manufacture of Molded Elastomers

| Examples | 7 | 8 | 9 | 10 | 11 | 12 | 13 |
|---|---|---|---|---|---|---|---|
| Raw Materials: | | | | | | | |
| Hydroxyl group-containing prepolymer: | | | | | | | |
| Polyethylene glycol adipate (mole weight 2000) (moles) | 2 | 2 | 2 | 2 | 2 | 3 | 5 |
| 2,4-:2,6-Toluene diisocyanate (80:20) (mole) | 1 | — | — | — | — | — | — |
| 4,4'-Diphenylmethane diisocyanate (mole) | — | 1 | — | — | — | — | — |
| 1,5-naphthylene diisocyanate (mole) | — | — | 1 | — | — | — | — |
| 1,6-hexamethylene diisocyanate (mole) | — | — | — | 1 | — | 2 | 4 |
| Isophorone diisocyanate (mole) | — | — | — | — | 1 | — | — |
| Viscosity 90° mPas | 1800 | 2800 | 2700 | 1600 | 1800 | 5500 | 25000 |
| Viscosity 130° mPas | 700 | 900 | 800 | 500 | 600 | 1500 | 7400 |
| NDI-polyurethane adduct: | | | | | | | |
| 1,5-naphthylene diisocyanate (moles) | 7 | 7 | 7 | 7 | 7 | 6.5 | 5.6 |
| Mechanical Properties: | | | | | | | |
| Shore A Hardness (DIN 53 505) | 96 | 96 | 91 | 89 | 89 | 97 | 96 |
| Tear Strength (DIN 53 504) N/mm$^2$ | 45 | 40 | 45 | 42 | 45 | 35 | 35 |
| Breaking Elongation (DIN 53 504) % | 650 | 500 | 700 | 630 | 650 | 600 | 580 |
| Wear (DIN 53 516) mm$^3$ | 50 | 55 | 55 | 60 | 70 | 60 | 55 |
| Compression Strength 70° (DIN 53 517) % | 26 | 30 | 25 | 25 | 25 | 40 | 45 |

TABLE 3

Manufacture of Molded Elastomers

| Examples | 14 | 15 | 3 | 16 | 17 |
|---|---|---|---|---|---|
| Raw Materials: | | | | | |
| Hydroxyl group-containing prepolymer: | | | | | |
| Polyethylene glycol adipate (mole weight 2000) (moles) | 2 | — | — | — | — |
| Polybutanediol-1,4-adipate, mole weight 1000 (moles) | — | 2 | — | — | — |
| Polycaprolactone diol, mole weight 3000 (moles) | — | — | 2 | — | — |
| Polytetrahydrofuran diol, mole weight 2050 (moles) | — | — | — | 2 | — |
| Poly(oxypropylene)-poly(oxyethylene) glycol, mole weight 2050 (moles) (20% ethylene oxide) | — | — | — | — | 2 |
| 2,4-:2,6-toluene diisocyanate (80:20) (mole) | 1 | 1 | — | — | — |
| 4,4'-Diphenylmethane diisocyanate (mole) | — | — | — | 1 | — |
| 1,5-naphthylene diisocyanate (mole) | — | — | — | — | 1 |
| 1,6-hexamethylene diisocyanate (mole) | — | — | 1 | — | — |
| Viscosity 90° mPas | 1800 | 1200 | 3500 | 4100 | 650/80° C. |
| Viscosity 130° mPas | 700 | — | — | — | — |
| NDI-polyurethane adduct: | | | | | |
| 1,5-naphthylene diisocyanate (moles) | 7 | 4 | 7 | 7 | 7 |
| Mechanical Properties: | | | | | |
| Shore A Hardness (DIN 53 505) | 96 | 87 | 95 | 87 | 85 |
| Tear Strength (DIN 53 504) N/mm$^2$ | 45 | 40 | 45 | 30 | 20 |
| Breaking Elongation (DIN 53 504) % | 650 | 500 | 600 | 450 | 400 |
| Wear (DIN 53 516) mm$^3$ | 50 | 70 | 50 | 100 | 160 |
| Compression Strength 70° C. (DIN 53 517) % | 26 | 35 | 45 | 35 | 28 |

TABLE 4

Manufacture of Cellular Elastomers

| Examples | 18 | 4 | 19 |
|---|---|---|---|
| Raw Materials: | | | |
| Hydroxyl group-containing prepolymer: | | | |
| Polyethylene glycol adipate (mole weight 2000) (moles) | 2 | 2 | 2 |
| 2,4-:2,6-Toluene diisocyanate (80:20) (mole) | 1 | 1 | 1 |
| NDI-polyurethane adduct: from 50% by weight of the resultant hydroxyl group-containing prepolymer and 1,5-naphthylene diisocyanate (moles) | 4 | 7 | 10 |
| Mixture B: of 50% by weight of the resultant hydroxyl group-containing prepolymer and water (mole) | 2 | 5 | 8 |
| Mechanical Properties: | | | |
| Density g/l | 520 | 500 | 280 |
| Tear Strength (DIN 53 504) N/mm$^2$ | 5 | 5.5 | 3 |
| Breaking Elongation (DIN 53 571) % | 550 | 450 | 400 |
| Graves Tear Strength (DIN 53 575) N/mm | 14 | 16 | 10 |
| Compression Stress, 40% Compression N/mm$^2$ | 0.4 | 0.7 | 0.3 |

EXAMPLE 20

NDI-Polyurethane Adduct

A hydroxyl group-containing prepolymer of 1.4 moles of polyethylene glycol adipate (mole weight 2000) and 0.7 mole, 2,4-:2,6-toluene diisocyanate (weight ratio 80:30) is reacted with 7 moles of 1,5-naphthylene diisocyanate as described in Example 1.

The mixture from step d consists of a hydroxyl group-containing prepolymer of 2.6 mole polyethylene glycol adipate (mole weight 2000) and 1.3 mole 2,4-:2,6-toluene diisocyanate (weight ratio 80:20) and 5 moles of water.

The NDI-polyurethane adduct and the mixture from step d are reacted according to Example 1. A cellular elastomer having the following mechanical properties is obtained:

Density: 490 g/l
Tear Strength (DIN 53 571): 5 N/mm$^2$
Breaking Elongation (DIN 53 571): 430 percent
Graves Tear Strngth (DIN 53 575): 16 N/mm
Compression Stress, 40% Compression: 0.65 N/mm$^2$ The embodiments of the invention in which an exclusive privilege or property is claimed are defined as follows:

1. A process for the manufacture of polyurethane elastomers comprising the steps of:
   (a) preparing a hydroxyl group-containing prepolymer by reacting a higher molecular weight polyhydroxyl compound with an organic diisocyanate at a weight ratio of OH groups to NCO groups of about 1.2:1 to 2:1,
   (b) dividing said prepolymer into two components A and B in a weight ratio of about 80:20 to 20:80,
   (c) reacting component A with 1,5-naphthylene diisocyanate (NDI) in a weight ratio of OH:NCO groups of about 1:2.5 to 1:12 to produce a terminal NCO group-containing NDI-polyurethane adduct,
   (d) mixing component B with material selected from the group consisting of chain extenders, crosslinking agents, water and mixtures thereof and optionally auxiliaries and additives, and
   (e) reacting said NDI polyurethane adduct (from step c) with the mixture from step d.

2. The process of claim 1 wherein said polyurethane elastomer is a non-cellular polyurethane elastomer.

3. The process of claim 2 wherein a chain extender, as well as said higher molecular weight polyhydroxyl compound, is reacted with the organic diisocyanate in step a.

4. The process of claim 2 wherein said higher molecular weight polyhydroxyl compound of step a has a molecular weight of about 500 to 8000 and the prepolymer prepared therefrom has a molecular weight of about 1100 to 20,000.

5. The process of claim 4 wherein said higher molecular weight polyhydroxyl compound is reacted with said organic diisocyanate at a temperature of about 60° to 150° C. for a time period of about 0.1 to 24 hours, said prepolymer component A is reacted with NDI at a temperature of about 100° to 150° C. for a period of about 0.25 to 3 hours and said NDI polyurethane adduct (from step c) is heated to 90° to 110° C. and the mixture from step d is heated to 50° to 90° C. prior to reacting together in step e.

6. The process of claim 5 wherein a chain extender, as well as said higher molecular weight polyhydroxyl compound, is reacted with the organic diisocyanate in step a.

7. The process of claim 5 wherein said higher molecular weight polyhydroxyl compound is selected from the group consisting of polyethylene glycol adipates, polytetrahydrofurans, polycaprolactone diols, and propylene oxide-ethylene oxide glycols, and said isocyanate is selected from the group consisting of hexamethylene diisocyanate, isophorone diisocyanate, toluene diisocyanates, and diphenylmethane diisocyanates.

8. The process of claim 7 wherein 1,4-butanediol is employed as the chain extender.

9. The process of claim 8 wherein a chain extender as well as said higher molecular weight polyhydroxyl compound is reacted with said isocyanate in step a.

10. A process for the manufacture of cellular polyurethane elastomers comprising the steps of
    (a) preparing a hydroxyl group-containing prepolymer by reacting a higher molecular weight polyhydroxyl compound with an organic diisocyanate at a weight ratio of OH groups to NCO groups of about 1.2:1 to 2:1,
    (b) dividing said prepolymer into two components A and B in a weight ratio of about 80:20 to 20:80,
    (c) reacting component A with 1,5-naphthylene diisocyanate (NDI) in a weight ratio of OH:NCO groups of about 1:2.5 to 1:12 to produce a terminal NCO group containing NDI-polyurethane adduct,
    (d) mixing component B with water, material selected from the group consisting of chain extenders, cross-linking agents and mixtures thereof and optionally auxiliaries and additives, and
    (e) reacting said NDI-polyurethane adduct (from step c) with the mixture from step d.

11. The process of claim 10 wherein a chain extender, as well as a higher molecular weight polyhydroxyl compound, is reacted with the organic diisocyanate in step a.

12. The process of claim 10 wherein said higher molecular weight polyhydroxyl compound of step a has a molecular weight of about 500 to 8000 and the prepolymer prepared therefrom has a molecular weight of about 1100 to 20,000.

13. The process of claim 12 wherein said higher molecular weight polyhydroxyl compound is reacted with said organic diisocyanate at a temperature of about 60° to 150° C. for a time period of about 0.1 to 24 hours, said prepolymer component A is reacted with NDI at a temperature of about 100° to 150° C. for a period of about 0.25 to 3 hours, and said NDI polyurethane adduct (from step c) is heated to 90° to 110° C. and said mixture with component B of step d is heated to 50° to 90° C. prior to reacting together in step e.

14. The process of claim 13 wherein a chain extender, as well as said higher molecular weight polyhydroxyl compound, is reacted with the organic diisocyanate in step a.

15. The process of claim 13 wherein said higher molecular weight polyhydroxyl compound is selected from the group consisting of polyethylene glycol adipates, polytetrahydrofurans, polycaprolactone diols, and propylene oxide-ethylene oxide glycols, and said isocyanate is selected from the group consisting of hexamethylene diisocyanate, isophorone diisocyanate, toluene diisocyanates, and diphenylmethane diisocyanates.

16. The process of claim 15 wherein 1,4-butanediol is employed as the chain extender.

17. The process of claim 16 wherein a chain extender as well as said higher molecular weight polyhydroxyl compound is reacted with said isocyanate in step a.

* * * * *